United States Patent [19]

Tucker et al.

[11] 4,167,612

[45] Sep. 11, 1979

[54] FLEXIBLE POLYURETHANE FOAMS HAVING LOW RESISTANCE TO AIR FLOW AND METHOD FOR PREPARATION

[75] Inventors: Richard B. C. Tucker; Roland N. Fracalossi; Mark T. Wajer, all of Baltimore, Md.

[73] Assignee: Wm. T. Burnett & Co., Inc., Baltimore, Md.

[21] Appl. No.: 916,745

[22] Filed: Jun. 19, 1978

[51] Int. Cl.$^2$ .................. B29D 27/00; C08G 18/14; C08G 18/63; C08G 18/32

[52] U.S. Cl. .................. 521/110; 264/321; 521/52; 521/132; 521/137; 521/160; 521/914; 428/425

[58] Field of Search ............... 264/321; 521/137, 110, 521/132, 160, 52

[56] References Cited

U.S. PATENT DOCUMENTS

| | | | |
|---|---|---|---|
| 2,961,710 | 11/1960 | Stark | 264/321 |
| 3,060,137 | 10/1962 | Gemeinhard et al. | 264/321 |
| 3,171,820 | 3/1965 | Volz | 260/2.5 |
| 3,175,025 | 3/1965 | Geen et al. | 264/321 |
| 3,405,217 | 10/1968 | Garrett et al. | 521/52 |
| 3,425,890 | 2/1969 | Powers | 521/52 |
| 3,862,282 | 1/1975 | Watson | 264/41 |
| 3,869,413 | 3/1975 | Blankenship | 521/137 |
| 3,884,848 | 5/1975 | Ricciardi et al. | 521/130 |
| 3,890,254 | 6/1975 | Guthrie | 521/52 |

FOREIGN PATENT DOCUMENTS

797893 10/1968 Canada ..................... 521/132

*Primary Examiner*—H. S. Cockeram
*Attorney, Agent, or Firm*—A. W. Breiner

[57] ABSTRACT

Flexible polyurethane foams having low resistance to air flow and, in addition, having good load bearing characteristics and high strength comprising the reaction product of polyisocyanate, a polyol blend including about 40–60 percent by weight of a polyether triol having an average molecular weight of about 4500–6500 and about 60–40 percent by weight of a reinforced polymer polyol having an average molecular weight of about 4500–5500 for the base polyol, and a low molecular weight cross-linking agent, such as 1,4-cyclohexanedimethanol or 4,4′ methylene-bis (2-chloroaniline). Preferably the air flow characteristics are improved by crushing the reaction product before it is fully cured.

15 Claims, No Drawings

FLEXIBLE POLYURETHANE FOAMS HAVING LOW RESISTANCE TO AIR FLOW AND METHOD FOR PREPARATION

FIELD OF INVENTION AND BACKGROUND

This invention relates to flexible polyurethane foams. More particularly it relates to flexible polyurethane foams having low resistance to air flow while having excellent load bearing characteristics and high strength, rendering the foam particularly useful as an air filter foam.

Polyurethane foam is used widely as a flexible cellular product in the comfort cushion market (furniture, bedding, automotive); in the textile area (apparel, blankets); in the industrial packaging and insulating fields; in other household furnishings and sponges; filters, and the like. The versatility of polyurethane foam, permitting its use in diverse markets, results in substantial part from the nature and variety of the raw materials which are used to produce the foam products, as well as the manner in which the raw materials and the resultant foam are processed. Foams ranging widely in density and hardness, in tensile and tear properties, in resistance to compression set and fatigue, in resilience and hysteresis, in durability and toughness are obtained by selection and variation in raw materials and processing conditions. An important further characteristic in foam that likewise varies widely is its breathability, or resistance to air flow, of the basic cellular structure. In the past efforts have been directed to the production of polyurethane foams, for example, for gasket applications, in which the foam was required to have high resistance to air flow. Similarly, foams have been produced with a reticulated structure, i.e., a structure wherein all the cell membranes are removed, so that the foam will exhibit very low resistance to air flow and permit the foams to be used commercially as an air filter. Flexible polyurethane foams having a reticulated structure are described in U.S. Pat. Nos. 3,171,820; 3,175,025; 3,884,848 and 3,862,282. The reticulated structures are provided by post treatment of the foams. While the reticulated foams heretofore produced have utility in various applications, the nature of the post-treatment methods used to produce such foams result in certain limitations. For example, the post-treatment methods add significantly to the cost of the foam. Moreover, the foam is weakened or softened as compared to the non-reticulated precursor due to the removal of the cell membranes.

It is also known to produce foams having improved breathability by eliminating or reducing the use of certain gellation catalysts such as the tin catalysts exemplified by stannous octoate. The foams are produced from conventional formulations other than for the catalyst modification. However, their processing must be rigorously controlled. Moreover, although the foams obtained have more open-celled structures, it is not possible to consistently produce large blocks of foam having uniformly high breathability throughout the dimensions of the block. Furthermore, the breathability of the foam must be restricted, otherwise large voids are formed during the blowing of the block, resulting in major amounts of scrap material. Additionally, such foams are prone to become unduly soft and exhibit abnormally high compression sets.

OBJECTS AND GENERAL DESCRIPTION OF INVENTION

Accordingly, it is a primary object of the present invention to produce a flexible polyurethane foam having very low resistance to air flow.

It is another object of this invention to produce flexible polyurethane foam having high air flow with superior physical characteristics such as good load-bearing characteristics and strength.

It is another object of the present invention to produce foam having the advantageous characteristics of a reticulated structure without sacrificing either the strength or the load-bearing characteristics of the polymer structure used to produce the foam.

It is still another object of this invention to provide a selection of raw materials which will produce strong, resilient, highly breathable foam products free of defects when processed on conventional foam processing equipment.

It is another object of the present invention to produce a foam product wherein the number of pores or cells per lineal inch is controlled without sacrificing either the high breathability or superior strength properties of the foam.

It is still another object of this invention to produce a highly breathable foam having excellent resistance towards hydrolysis aging.

It is still another object of the present invention to provide a method of producing flexible polyurethane foam having low resistance to air flow.

The aforesaid and other objects of the present invention will become fully apparent from the following description.

Briefly, the objects of the present invention are accomplished by selecting as raw materials for the production of a flexible polyurethane foam, a polyol blend, a low molecular weight cross-linking component; a polyisocyanate, and conventional additives for polyurethane foams. More specifically, the basic polyol component of the foam-forming mixture of the present invention is a blend of a high molecular weight reinforced polyol and a non-reinforced or conventional polyol. The preferred blend includes about 40–60 percent by weight of a conventional polyether triol having a molecular weight of from about 4500–6500, wherein the starting triol has been extended with propylene oxide and further capped with ethylene oxide to provide primary hydroxyl groups for reaction with a diisocyanate, and from about 60–40 percent of a capped primary—hydroxyl polymer polyol wherein the molecular weight of the base polyol is from about 4500–5500 and the reinforcing is accomplished by the addition of a stable dispersion of vinyl polymer. The vinyl polymer employed can be selected from any of the commercially available vinyl polymers present in an amount of from about 10 to 30 percent by weight of the polymer polyol. The term "capped" as used herein means that the polyether polyol terminates in primary hydroxyl groups resulting from the addition of ethylene oxide in the final stages of polyol polymerization.

The polyisocyanate useful according to the present invention is preferably toluene diisocyanate in the crude, undistilled form, as marketed, for example, by the duPont Company under the tradename Hylene TCPA. However, other polyisocyanates can be selected including compounds having the general formula $R—(NCX)_z$, where X may be oxygen or sulfur, z an integer of one or more, and R an organic radical. These isocyanates, therefore, may be either aromatic or aliphatic, or mixed aromatic-aliphatic products. Although it is necessary to have more than 50 percent of z in these reactions equal to at least two to promote polymerization, monofunctional compounds are often desirable to modify the product. Specific isocyanates useful herein and commercially available are toluene 2,4-diisocyanate, toluene 2,6 diisocyanate, methylene bis(4-phenylisocyanate), 3,3'bitoluene 4,4'diisocyanate, hexamethylene-diisocyanate, and octyldecylisocyanate. Other useful polyisocyanates are ethylene diisocyanate, trimethylene diisocyanate, tetramethylene diisocyanate, decamethylene diisocyanate, heptylidene diisocyanate, and the corresponding diisothiocyanates; cycloalkylene diisocyanates and diisothiocyanates, e.g., cyclopentylene diisocyanate, cyclohexylene diisocyanate; aromatic diisocyanates and diisothiocyanates, e.g., m-phenylene diisocyanate, naphthalene diisocyanate, and diphenyl-4,4'diisocyanate; aliphatic-aromatic diisocyanates and diisothiocyanates, e.g., xylene-1,4-diisocyanate and 4,4'diphenylenemethane diisocyanate; heterocyclic diisocyanates and diisothiocyanates, such as $SCNCH_2OCH_2NCS$ and $SCN(CH_2)_3-S-(CH_2)_3NCS$; the isocyanates and isothiocyanates containing more than two functional groups, e.g., benzene 1,2,4-triisothiocyanate, 1,2,2-triisocyanatobutane, toluene triisocyanate; and as modifiers, the monoisocyanates and monothioisocyanates, e.g., octylisocyanate and octadecylisocyanate.

The low molecular weight cross-linking component preferably is 1,4 cyclohexanedimethanol marketed commercially, for example, by Eastman Chemical Products and which is available as a waxy solid or a concentrated solution in water. As a solid it can be melted down and mixed with the polyol blend to give a masterbatch that is readily pumped to the mixing head of a foaming machine, or the water concentrate, if selected for use, can be handled and pumped by itself. Both forms of 1,4 cyclohexanedimethanol give similar results in terms of the final foam product. An additional useful cross-linking agent is 4,4'methylene-bis(2-chloroaniline). The cross-linking agent, for best results, is employed in an amount of from about 3 to 25 percent by weight based on the polyol blend and preferably from about 5 to 15 percent by weight. These cross-linking agents retard the cure of the foam, maintaining it soft for efficient crushing and then contribute to the tear strength and firmness of the fully cured foam through reaction of the hydroxyl or amine groups with the polyisocyanate.

In addition to the polyol blend, the polyisocyanate and low molecular weight cross-linking agent, the foam-forming reaction mixture will also include stabilizers, catalysts, pigments, water, and other additives as conventionally utilized in foam formation. The preferred stabilizer for use herein is a dimethyl polysiloxane such as Dow Corning's dimethyl polysiloxane fluid, DC-200, five centistokes, which is sold as F-11630 fluid. The F-11630 fluid, in comparison to other surfactant/stabilizer components commonly used in the production of resilient and flexible urethane foams, in the formulation of the present application tends to add stability and uniformity to the cell structure of the produced foam and at the same time reduces substantially the risk of shrinkage occurring in the freshly made foam. Any unreasonable amount of shrinkage in the "green" or not completely cured foam can cause substantial problems during the crushing cycles of the preferred embodiment of the present invention as will be described in detail hereinafter. For example, tearing of the foam may occur during the crushing cycles due to rapid displacement of the hot gases within the individual cells during the crushing cycles if the gas displacement is retarded by the presence of a higher level of cell membranes due to shrinkage. Tearing is due to internal stresses than can rupture not only the membranes, but the basic skeletal rib structure as well. The preferred stabilizer is used in relatively small amounts and it has been found suitable to premix the stabilizer with a mineral oil component for controlled metering and pumping to the mixing head of the foam machine. Inasmuch as the components used to produce the foam contribute largely to the formulation of a cellular polymer having initially weaker cellular membranes, it has also been found that the mineral oil used as a carrier for the stabilizer contributes to the breathability of the foam since it acts to further weaken the already sensitive physical characteristics of the membranes. While the mineral oil improves the breathability of the foams of this invention, we have found that it has practically no effect in conventional polyether urethane foams produced, for example from lower molecular weight polyether polyols that are reacted with conventional polyisocyanates such as a 80:20 isomer blend of 2:4 and 2:6 toluene diisocyanate. The mineral oil used herein has a viscosity of about 59 SUS at 100° F. and a paraffinic carbon atom content of about 66.4 percent.

The catalysts found useful according to the present invention are those commonly employed in the manufacture of flexible polyurethane foams and include the amines, such as dimethylethanolamine; triethylenediamine, n-ethyl morpholine, dimethylcetylamine, tin catalysts such as stannous octoate and the like.

Other additives which can be advantageous used in the flexible polyurthethane foams of this invention include fire retardants, such as those commercially available containing the elements phosphorous, chlorine, bromine, boron, and antimony; and the commonly employed surfactants such as the organic and organo-silicone surfactants.

The flexible polyurethane foams having low resistance to air flow, while retaining excellent physical characteristics, are obtained by mixing together on currently known and conventionally used foam processing equipment combinations of the above-described essential components. When the reaction mixture is allowed to react and rise freely on a moving casting conveyor in a manner known in the art to produce large slabs of flexible polyurethane foams, foam products which are initially soft with a stable cellular structure are obtained. Preferentially the products while "green," i.e., before being fully cured, but after reaching full rise; are severely compressed or crushed so as to make a highly breathable foam product. The select combination of components hereinbefore described provide a readily crushable foam. The select mixture of polyols reacted with a polyisocyanate in the presence of the low molecular weight crosslinking agent and other additives provides a foam which can be crushed while "green" without tearing or rupture of the foam block. The foam has very desirable firmness and strength when it becomes fully cured. It is theorized that the presence of the low molecular weight crosslinking and/or curing substances retards the gellation and cure of the urethane polymer whereby the cellular membranes shortly after the foam has completed its rise have unusually low physical strength relative to the material in the skeletal struts or ribs of the cellular matrix. This makes it advantageous to break or displace the cell membranes rather easily with appropriate crushing without tearing the struts or ribs in the sketetal framework of the cell. However, when fully cured the foam has a firm texture and excellent tear strength, two characteristics that are particularly suited for foam panels designed for installation as air filters. Foams that are soft are more prone to damage through various difficulties that occur during installation and maintenance of filters. Soft foams may lack dimensional integrity essential during installation and may even become displaced or buckled under high air velocities unless properly anchored.

The crushing technique found suitable to render the "green" foam highly breathable may simply include mounting a large diameter rigid compression roll above the foam block to be crushed in such a manner that the roll can be moved vertically up and down into and away from the foam as the foam moves on a conveyor passing beneath the roll. The amount of compression needed to adequately rupture the membranes is from about 80–95 percent of the height of the block of foam. The diameter of the roll preferably is at least one-half the height dimension of the foam block. The velocity of the foam block is adjusted to the rate of upward-downward movement of the compression roll so that no portion of foam receives less than 80 percent compression and preferably no less than 90 percent. After the foam block has been crushed in one direction, that is, from top to bottom as determined by the direction of foam rise; it is then preferable although not essential to rotate the block about 90 degrees and proceed with a second crushing cycle similar to the first. In this manner it was found that a greater number of cell membranes are ruptured, thus giving even greater breathability to the foam.

Upon removal from the crushing cycles, the blocks have been found to retain their soft texture and low compressive modulus as well as a significant part of the heat that was generated from the exothermic heat of the foam-forming reactions. When the blocks are stored overnight, it was found that further cure takes place and the foam hardens appreciably, attaining a level of firmness and strength that complements its high breathability factor.

The range of breathabilities provided by the foams according to the present invention in combination with the corresponding range of sizes of the average individual cell unit is well suited to many known uses. Most notable is their use as an air filter medium. Moreover, when the foam made according to this invention is combined with various woven or non-woven fabrics by appropriate laminating techniques, the composites so produced have improved characteristics for utility in wearing apparel, industrial and automotive fabrics, seat and mattress covers, and other uses that benefit directly from the fact that the foam component has superior characteristics related to its high breathability factor. The superior characteristics include improved hand, resilience, appearance (for example, less sparkle or reflectance as a result of less membranes), and better overall uniformity of physical properties.

Breathability as used herein can be expressed in several ways. One commonly recognized method is to calculate the resistance to air flow in terms of the pressure-drop across a given thickness of a specimen of foam at different air velocities. However, the air flow cannot be turbulent. It is generally known that with cellular or porous materials such as flexible polyurethane foams having fully reticulated cellular structures, as the cell size of the foam decreases, for example from coarse to fine, the breathability of the foam likewise decreases. The finer cells simply present a greater area of contact with the incoming air stream, creating a frictional drag that tends to reduce the rate of air flow through the foam.

"Flexible foam" as used throughout this specification, has the meaning of a flexible foam as set forth in "Polyurethanes: Chemistry And Technology, Part II. Technology," J. H. Saunders and K. C. Frisch, Interscience Publishers, 1964, pages 117 to 159.

The following table illustrates the extent of breathability attained with the foams according to the present invention. Comparison is made with a good open-celled commercial grade of polyether urethane foam.

| AIR FLOW RESISTANCE (Inches of Water) | 15–20 pore | 25–30 pore | 35–40 pore | Commercial Polyether Foam (35–40 pore) |
|---|---|---|---|---|
| @300 fpm air velocity | .08–.13 | .15–.20 | .18–.25 | .45–.75 |
| @450 fpm air velocity | .22–.27 | .34–.40 | .38–.45 | .90–1.50 | fpm = feet per minute

The values as set forth were obtained from foam having a thickness of one-half inch and represents the range found in each of the three pore sizes illustrated.

As above stated, foams having high breathability (or low air flow resistance) are well-suited in areas of application where it is necessary that the foam transmit high volumes of air or other gases. Conventional polyurethane foams as normally produced are unsatisfactory for such applications because of their relatively high air flow resistance. Reticulated foams, which are modified foams, are essentially membrane-free and will give air flow resistances of very low values. For example, a one-half inch thick reticulated foam of 15–20 pore size will provide an air-flow resistance of about 0.10 inches of water @ 450 fpm air velocity. For many applications it is not necessary, and sometimes not desirable, that an air-flow resistance as low as with a reticulated structure be obtained, particularly when such low values result in a more expensive foam product. Accordingly, the intermediate levels of air flow obtained according to the present invention are highly advantageous.

THE EXAMPLES

To more fully illustrate the present invention, preferred embodiments will be set forth. These embodiments will establish the chemical formulations to be employed and crushing techniques to be followed to obtain, in large scale production, flexible polyurethane foams having low resistance to air flow; good strength and high load-bearing characteristics, as well as good appearance. It is to be understood, however, that the examples are illustrative only and are not set forth as being limiting. Parts are by weight throughout unless otherwise designated.

EXAMPLE 1

A blend of 50 parts of polyether polyol, Fomrez A 1228[1], and 50 parts of polymer polyol, Niax 31-28[2], was allowed to mix and react with 57.7 parts of Hylene TCPA, which is toluene disocyanate in the crude, undistilled form, marketed by the duPont Company, at room temperatures on conventional urethane foam processing equipment in the presence of the following additional components:

| | |
|---|---|
| 1,4 cyclohexanedimethanol | 10 parts |
| water | 3.35 |
| mineral oil (Sunvis 6H) | 4.0 |
| stabilizer (F 11-630) | 0.007 |
| dimethylethanolamine catalyst | 0.6 |
| triethylenediamine catalyst (DABCO 33 LV) | 0.6 |
| aqueous pigment dispersion | 0.2 |

[1] Fomrex A 1228, marketed by Witco Chemical Company, is a polyether polyol having capped primary-hydroxyl groups and a molecular weight of 6500.
[2] Niax 31-28, marketed by Union Carbide Corporation, is a polymer polyol comprising 21 percent by weight acrylonitrile that has been grafted to a capped primary-hydroxyl base polyether polyol of 5000 molecular weight.

Sufficient raw materials were used to produce a slab of foam having a height and width of approximately 22 inches. The pressure in the mixing head was adjusted so that the foam would have a cell count of 15–20 pores per lineal inch. The slab produced was stable and free of undesirable shrinkage. Thirty minutes after reaching full rise, the slab was compressed rapidly about 92 percent in the direction of foam rise, followed immediately by 92 percent compression at an approximately 90 degree angle from the direction of foam rise. The slab recovered its dimensions after the two crushings and was allowed to set and cure for 24 hours. The physical properties of the cured foam were as follows:

| | |
|---|---|
| Pore Size, cells per lineal inch | 15–20 |
| Air Flow Resistance, ½ inch thickness | |
| @300 fpm | 0.10 inch $H_2O$ |
| @450 fpm | 0.25 inch $H_2O$ |
| Tensile Strength, psi | 22.1 |
| Ultimate Elongation, % | 150 |
| Tear Resistance, ppi | 4.1 |
| Compression Load, psi | |
| @ 25% deflection | 0.40 |
| @ 50% deflection | 0.70 |
| @ 70% deflection | 1.32 |

EXAMPLE 2

The formulation, including raw material weight, and processing, including the crushing technique, of Example 1 were used in this example. However, the pressure in the mixing head was so reduced so that the foam would have a cell count of 25–30 pores per lineal inch. Again a stable slab was produced free of undesirable shrinkage. After the crushing and curing for 24 hours, the physical properties of the foam were as follows:

| | |
|---|---|
| Pore Size, cells per lineal inch | 25–30 |
| Air Flow Resistance, ½ inch thickness | |
| @ 300 fpm | 0.18 inch $H_2O$ |
| @ 450 fpm | 0.37 inch $H_2O$ |
| Tensile Strength, psi | 30.0 |
| Ultimate Elongation, % | 200 |
| Tear Resistance, ppi | 4.25 |
| Compression Load, psi | |
| @ 25% deflection | 0.33 |
| @ 50% deflection | 0.62 |
| @ 70% deflection | 1.49 |

EXAMPLE 3

This example illustrates the ability to reduce the compression load-bearing characteristics of the foam without altering its high breathability, accomplished by increasing the amount of the polyether polyol used in Examples 1 and 2 to 60 parts and decreasing the polymer polyol to 40 parts. After processing as in Example 1 and a 24 hour cure, the physical properties of the foam were as follows:

| | |
|---|---|
| Pore Size, cells per lineal inch | 25–30 |
| Air Flow Resistance, ½ inch thickness | |
| @ 300 fpm | 0.15 inch $H_2O$ |
| @ 450 fpm | 0.35 inch $H_2O$ |
| Tensile Strength, psi | 23.5 |
| Ultimate Elongation, % | 165 |
| Tear Resistance, ppi | 3.8 |
| Compression Load, psi | |
| @ 25% deflection | 0.28 |
| @ 50% deflection | 0.35 |
| @ 70% deflection | 0.75 |

EXAMPLE 4

The formulation and processing techniques of Example 2 were used in this example. However, the pressure in the mixing head was further reduced so that the foam would have a cell count of 35–40 pores per lineal inch. A stable, uniform slab was produced free of shrinkage which withstood crushing 30 minutes after full rise without tearing or loss of dimensions. After a 24-hour cure at room temperature the physical properties of the foam were as follows:

| | |
|---|---|
| Pore Size, cells per lineal inch | 35–40 |
| Air Flow Resistance, ½ inch thickness | |
| @ 300 fpm | 0.21 inch $H_2O$ |
| @ 450 fpm | 0.39 inch $H_2O$ |
| Tensile Strength, psi | 34 |
| Ultimate Elongation, % | 165 |
| Tear Resistance, ppi | 4.0 |
| Compression Load, psi | |
| @ 25% deflection | 0.42 |
| @ 50% deflection | 0.60 |
| @ 75% deflection | 1.18 |

In the aforesaid examples the polyol blend can be modified within the scope hereinbefore designated. Moreover, the polyisocyanate can be replaced with suitable adjustments being made in amounts, as known to one skilled in the art. Blends of TDI (toluene diisocyanate) and MDI (diphenylmethane 4,4' diisocyanate) are particularly suitable. Further, although 1,4-cyclohexanedimethanol is the preferred low molecular weight crosslinking agent in view of its non-toxic character, availability and the excellent results obtained, it can be replaced with 4,4'-methylene(bis)-2-chloroaniline. 4,4'-methylene(bis)-2-chloroaniline is available as a solid or as a viscous liquid from the duPont Company under the tradename LD-813. From about 5 to 12 parts of LD-813 per 100 parts of the high molecular weight polyol permits the production of foams of superior strength and load-bearing characteristics. Additionally, the foams obtained are readily and similarly crushed as herein disclosed to produce foams having sufficient pore size variation and high air flow characteristics to permit use as air filters, or the like, as above described. Moreover, it is possible to vary the crushing cycle. However, the crushing must be performed within a reasonable period of time after attaining full height of the foam in the slab configuration; and specifically from about 15 minutes and 1 hour after full rise. Otherwise, the breathability of the foams is inadequate for application as an air filter or the like.

It is to be appreciated that while there are above disclosed but a limited number of embodiments of this invention, it is possible to produce still other embodiments without departing from the inventive concept herein disclosed.

It is claimed:

1. A flexible polyurethane foam characterized by its low resistance to air flow, high load bearing characteristics and high strength comprising the reaction product of a polyisocyanate; a polyol blend including from about 40–60 percent by weight of a polyether triol having an average molecular weight of about 4500 to about 6500 and from about 60–40 percent by weight of a reinforced polymer polyol having an average molecular weight of about 4500 to about 5500, said reinforcing of said polyol being through the addition of a stable dispersion of a vinyl polymer to said polyol in an amount of from about 10 to 30 percent by weight of the polymer polyol; and a low molecular weight cross-linking agent selected from the group consisting of 1,4-cyclohexanedimethanol and 4,4′methylene-bis (2-chloroaniline).

2. The flexible polyurethane foam of claim 1 wherein the polyisocyanate is crude, undistilled toluene diisocyanate.

3. The flexible polyurethane foam of claim 1 wherein the polyisocyanate is a blend of toluene diisocyanate and diphenylmethane 4,4′diisocyanate.

4. The polyurethane foam of claim 2 wherein the polymer polyol of the polyol blend is reinforced with about 21 percent by weight acrylonitrile grafted to a capped primary-hydroxyl base polyether polyol.

5. The polyurethane foam of claim 2 wherein the low molecular weight cross-linking agent is 1,4-cyclohexanedimethanol.

6. The polyurethane foam of claim 5 wherein the polyurethane foam includes a dimethyl polysiloxane stabilizer.

7. The polyurethane foam of claim 6 wherein said stabilizer is pre-mixed with mineral oil.

8. The method of forming a flexible polyurethane foam characterized by its low resistance to air flow, high load bearing characteristics and high strength comprising the steps of (1) foaming a flexible polyurethane foam by reacting a polyisocyanate, a polyol blend including from about 40–60 percent by weight of a polyether triol having an average molecular weight of about 4500 to about 6500 and from about 60–40 percent by weight of a reinforced polymer polyol having an average molecular weight of about 4500 to about 5500, said reinforcing of said polyol being through the addition of a stable dispersion of a vinyl polymer to said polyol in an amount of from about 10 to 30 percent by weight of the polymer polyol; and a low molecular weight cross-linking agent selected from the group consisting of 1,4-cyclohexanedimethanol and 4,4′methylene-bis (2-chloroaniline); and (2) while said flexible polyurethane foam is in the "green" uncured state, compressing said foam in at least one direction to about 80 to 95 percent of the height of the block of foam.

9. The method of claim 8 wherein the polyisocyanate is crude, undistilled toluene diisocyanate.

10. The method of claim 8 wherein the polyisocyanate is a blend of toluene diisocyanate and diphenylmethane 4,4′diisocyanate.

11. The method of claim 9 wherein the polymer polyol of the polyol blend is reinforced with about 21 percent by weight acrylonitrile grafted to a capped primary-hydroxyl base polyether polyol.

12. The method of claim 9 wherein the low molecular weight cross-linking agent is 1,4-cyclohexanedimethanol.

13. The method of claim 12 wherein the polyurethane foam includes a dimethyl polysiloxane stabilizer.

14. The method of claim 13 wherein said stabilizer is pre-mixed with mineral oil.

15. The method of claim 12 wherein the foam is first compressed in the direction of foam rise and thereafter the foam rotated by about 90 degrees and again crushed.

* * * * *

UNITED STATES PATENT AND TRADEMARK OFFICE
CERTIFICATE OF CORRECTION

PATENT NO. : 4,167,612
DATED : September 11, 1979
INVENTOR(S) : Richard B. C. Tucker et al It is certified that error appears in the above-identified patent and that said Letters Patent is hereby corrected as shown below:

Column 10, Claim 8, line 4, "foaming" should read --forming--.

Signed and Sealed this

Fourth Day of October 1983

[SEAL]

Attest:

GERALD J. MOSSINGHOFF

Attesting Officer

Commissioner of Patents and Trademarks